US008901236B2

(12) United States Patent
Burton et al.

(10) Patent No.: US 8,901,236 B2
(45) Date of Patent: Dec. 2, 2014

(54) PROCESS FOR CREATING AN ETHYLENE ELASTOMER

(71) Applicant: Lion Copolymer, LLC, Baton Rouge, LA (US)

(72) Inventors: Willie Charles Burton, Baton Rouge, LA (US); Solomon H. K. Tang, Baton Rouge, LA (US); Garrett Doucet, Baton Rouge, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 14/049,037

(22) Filed: Oct. 8, 2013

(65) Prior Publication Data

US 2014/0100325 A1    Apr. 10, 2014

Related U.S. Application Data

(60) Provisional application No. 61/711,596, filed on Oct. 9, 2012.

(51) Int. Cl.
| | | |
|---|---|---|
| C08L 23/16 | (2006.01) | |
| C08F 236/20 | (2006.01) | |
| C08F 2/14 | (2006.01) | |
| C08F 2/34 | (2006.01) | |
| C08F 2/38 | (2006.01) | |
| C08F 210/06 | (2006.01) | |
| C08L 23/14 | (2006.01) | |
| C08F 210/18 | (2006.01) | |
| C08F 4/642 | (2006.01) | |
| C08F 4/68 | (2006.01) | |

(52) U.S. Cl.
CPC ............. *C08F 236/20* (2013.01); *C08F 210/06* (2013.01); *C08L 23/145* (2013.01); *C08F 210/18* (2013.01); *Y10S 526/905* (2013.01)
USPC ............. 524/554; 524/579; 526/88; 526/143; 526/169.2; 526/282; 526/905

(58) Field of Classification Search
CPC ........ C08F 2/06; C08F 4/6093; C08F 210/18; C08F 2500/09
USPC ......... 526/143, 169.2, 282, 905, 88; 524/554, 524/579
See application file for complete search history.

(56) References Cited

U.S. PATENT DOCUMENTS

| | | | |
|---|---|---|---|
| 3,838,137 A * | 9/1974 | Tang | 526/144 |
| 3,856,765 A | 12/1974 | Collette et al. | |
| 3,903,062 A | 9/1975 | Arrighetti et al. | |
| 4,156,767 A * | 5/1979 | Hall | 526/282 |
| 5,473,017 A | 12/1995 | Wang | |
| 5,621,044 A | 4/1997 | Wang | |
| 5,786,504 A | 7/1998 | Nudenberg et al. | |
| 6,300,451 B1 | 10/2001 | Mehta et al. | |
| 6,384,162 B1 | 5/2002 | Zahalka et al. | |
| 2004/0122190 A1 | 6/2004 | Cady et al. | |

FOREIGN PATENT DOCUMENTS

CA    980497    * 12/1975

OTHER PUBLICATIONS

Skinner et al, Cis-trans isomerism in Ziegler-catalysed terpolymerization of hexa-1,4-diene with ethylene and propylene, Polymer, vol. 13, Issue 5, May 1972, pp. 242-244.

* cited by examiner

*Primary Examiner* — Fred M Teskin
(74) *Attorney, Agent, or Firm* — Buskop Law Group, PC; Wendy Buskop

(57) ABSTRACT

A process for continuously making a terpolymer or a tetrapolymer utilizing ethylene, an alpha olefin, and at least one polyene. This process allows for the creation of products with high polyene contents and broad molecular weight distributions while utilizing a continuous flow reactor and a known catalyst. The process allows for these products to be made without gelling, or fouling of the reactor.

20 Claims, No Drawings

PROCESS FOR CREATING AN ETHYLENE ELASTOMER

CROSS REFERENCE TO RELATED APPLICATIONS

The current application claims priority to and the benefit of U.S. Provisional Patent Application Ser. No. 61/711,596 filed on Oct. 9, 2012, entitled "METHOD FOR MAKING A SPONGE POLYMER." This reference is hereby incorporated in its entirety.

FIELD

The present embodiments generally relate to a process for making a terpolymer or tetrapolymer comprising ethylene, an alpha olefin, and at least one non-conjugated polyene.

BACKGROUND

A need exists for a process to create high performance polymer products with a significant degree of long chain branching, broad molecular weight distributions, and favorable viscosity and elasticity characteristics. Further, a need exists for a process to create polymer products with high polyene content in a single reactor without reactor fouling due to gelling of reactants.

The present embodiments meet these needs.

BRIEF DESCRIPTION OF THE DRAWINGS

N/A

DETAILED DESCRIPTION OF THE EMBODIMENTS

Before explaining the present process in detail, it is to be understood that the process is not limited to the particular embodiments and that it can be practiced or carried out in various ways.

The present embodiments relate to a process for making a copolymer, specifically a terpolymer or a tetrapolymer. The copolymer boasts surprising physical and chemical characteristics as well as excellent processability. The copolymer exhibits exceptional smoothness when extruded, molded, or calandered and is suitable for use in multiple products such as sealing products, noise dampening products, vibration dampening products, conveyor belts, wire and cable, insulation, and tubing. The copolymer further exhibits excellent non-linear viscosity characteristics and compression set characteristics.

A benefit of the process is that the chemical components are easy to process and allow for a continuous flow process which can be operated 24 hours a day, 7 days a week, making a bright polymer with high purity.

In one or more embodiments, the process can involve blending an extender oil and other components into the copolymer to create compounds usable for extrusion, molding, calandaring, or as a thermoplastic vulcanizate.

A benefit of the process is that the resulting copolymer can be reduced easily into friable bales for easy transport and delivery to a user of the polymer.

A benefit of this copolymer formed by this process is that the material is easy to use in a mixer, breaking down for easy blending with other compounding ingredients.

The invention generally involves a continuous process for making a copolymer utilizing ethylene, an alpha olefin, and at least one non-conjugated polyene.

The process enables a person ordinarily skilled in the art to create copolymers containing high polyene content without reactor fouling due to gelling (or uncontrolled branching reactions). The process further allows generating a product with high degrees of long chain branching, a high molecular weight, a broad molecular weight distribution (MWD), a low tangent delta, and a high polyene content while making use of a known catalyst and a single reactor.

As used within this application, alpha olefin shall refer to an olefin (also known as an alkene) or a hydrocarbon, containing a single double bond at the primary or alpha position. Olefins typically have no additional functional chemical groups. The location of this double bond increases the reactivity of the alpha olefin with respect to olefins with a double bond internal to the hydrocarbon chain.

As used within this application, a non-conjugated polyene shall refer to an organic compound containing two or more double bonds wherein the double bonds do not alternate with a single bond. Further, the non-conjugated polyene shall be capable of being polymerized by a Ziegler-Natta catalyst.

As used within this application, the molecular weight distribution (MWD) shall refer to the weight average molecular weight of a polymer (Mw) divided by the number average molecular weight of a polymer (Mn). Mw and Mn are determined as follows:

$$M_n = \frac{\sum_i N_i M_i}{\sum_i N_i} \text{ and } M_w = \frac{\sum_i N_i M_i^2}{\sum_i N_i M_i}$$

Wherein, $N_i$ is the number of molecules having molecular weight $M_i$ in a given polymer sample.

As used within this application, the tangent delta is a measure of the relationship between viscosity and elasticity that is known to those ordinarily skilled in the art.

The descriptions below make use of norbornene derivatives as the non-conjugated polyene for exemplary reasons. However, other non-conjugated polyenes with similar chemical and reactive characteristics can be substituted by persons ordinarily skilled in the art.

In this process, a 5-Ethylidene-2-norbornene (ENB) can be used. In embodiments it can comprise the structure:

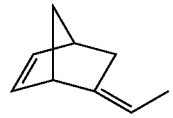

Molecular Structure:
Formula: C9H12
Molecular Weight: 120.19
Synonyms for this molecule can include: ENB; Ethylidene Norbornene; 5-Ethylene-2-Norborene; Ethylidene-2-Norbornene; 5-Ethylidene Norbornene; 5-Ethylidene-2-Norbornen; 5-Ethylidenenorborn-2-ene; 5-ethylidene-5-norbornene; Ethylidene Norbornene (ENB)
Boiling Point: 146 degrees Celsius at 760 mmHg
Flash Point: 38.3 degrees Celsius
In this process, a 5-vinyl-2-norbornene (VNB) can be used which is known by the structure:

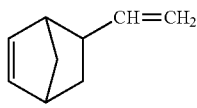

Molecular Structure:
Formula: C9H12
Molecular Weight: 120.21

Synonyms for this molecule can include: 2-Norbornene, 5-vinyl-(6CI,7CI,8CI); 2-Vinyl-5-norbornene; 2-Vinylbicyclo[2.2.1]hept-5-ene; 2-Vinylnorbornene; 5-Ethenylbicyclo[2.2.1]hept-2-ene; 5-Vinyl-2-norbornene; 5-Vinylbicyclo[2.2.1]hept-2-ene; 5-Vinylnorbornene; NSC 61529; V 0062; VBH; Vinylnorbornene Boiling Point: 141 degrees Celsius at 760 mmHg Flash Point: 28 degrees Celsius VNB is a non-conjugated polyene with which it is known to be difficult to create copolymers due to its propensity to branch uncontrollably, create gels during polymerization, and foul a reactor. The current process allows for relatively large concentrations of VNB in tetrapolymers, and uniquely allows for terpolymers with a VNB component to be created.

The general process is described as follows:

A saturated hydrocarbon solvent is utilized as a reaction medium and carrier stream for all monomers used in the process. The saturated hydrocarbon is introduced to the reactor at a flow rate adequate to sustain a residence time of 30 minutes to 60 minutes in the reactor. Prior to entering the reactor, the saturated hydrocarbon stream is passed through a chiller to reduce its temperature below 35 degrees Celsius.

In the examples shown below, hexane is used as the hydrocarbon solvent due to its ready availability and ease of removal from the final product. However, many other hydrocarbon solvents can be utilized, such as butane, pentane, heptane, octane, or combinations thereof.

A pure ethylene monomer is introduced to the saturated hydrocarbon solvent at a flow rate to achieve the desired ethylene weight content in a final product. The ethylene content in the final product can range from 35 percent to 80 percent by weight.

A pure alpha olefin monomer is introduced to the saturated hydrocarbon solvent at a flow rate to achieve the desired alpha olefin weight content in a final product. The alpha olefin content in the final product can range from 14 percent to 50 percent by weight.

The examples shown below utilize propylene as the alpha olefin, and a diene as the polyene. However, similar results are to be expected with other alpha olefins comprising from 3 carbon atoms to 20 carbon atoms. Similar results are also to be expected when substituting other polyenes in lieu of a diene.

Utilizing ethylene, propylene, and a diene results in an ethylene propylene diene monomer (EPDM) in the examples below. EPDM is a well-known product class with desirable properties.

Hydrogen is introduced to the saturated hydrocarbon solvent at a flow rate adequate to achieve a desired molecular weight in the final product.

A non-conjugated polyene(s) is introduced to the saturated hydrocarbon solvent/carrier a rate sufficient to achieve the desired weight percent in the final polymer. A single polyene is introduced when the desired resultant is a terpolymer. Two different polyenes are introduced when the desired resultant is a tetrapolymer The non-conjugated polyene(s) can be numerous compounds as known to persons ordinarily skilled in the art. In the current example, both 5-ethylidene-2-norbornene (ENB) and 5-Vinyl-2-norbornene (VNB) are used as non-conjugated polyene(s) for preparing a final product.

Some examples of other norbornene derivatives are: 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene.

The mixture of the saturated hydrocarbon solvent, alpha olefin, hydrogen, and polyene(s) is sent through a chiller to reduce its temperature below 35 degrees Celsius. As the polymerization reaction to follow is exothermic, this cooling step helps to maintain the desired temperature range within the reactor. Although the process as described is for solution polymerization, with some minor adjustments to catalyst, it can be adapted to gas, or slurry phase processes.

A Ziegler-Natta catalyst, optionally a catalyst promoter, and co-catalyst, are introduced to the reactor concurrently with the cooled mixture of the saturated hydrocarbon solvent, alpha olefin, hydrogen, and polyene(s).

The Ziegler-Natta catalyst comprises a transition metal, or transition metal compound. Some examples of transition metals (or compounds thereof) for the current invention are Vanadium, Titanium, and Zirconium. However, other transition metals can be substituted by persons ordinarily skilled in the art.

The Ziegler-Natta catalyst is introduced at a flow rate sufficient to sustain a continuous reaction. The examples below serve to illustrate this.

The co-catalyst comprises a metal alkyl which further comprises a halogen element. The co-catalysts utilized can be Diethylaluminum chloride, Ethylaluminum sesquichloride, or Ethylaluminum dichloride.

However, many other compounds can be substituted by persons ordinarily skilled in the art.

The co-catalyst is introduced at a flow rate sufficient to sustain a continuous reaction. The example below serves to illustrate this.

The promoter comprises an oxidizing agent capable of oxidizing the transition metal and generating at least one halogen free radical per mole of promoter used. An example of a promoter is a chlorinated ester, such as Butyl-2methyl, 4,4,4-trichlorobut-2-enoate. However, many other organic compounds that generate halogen free radicals can be substituted by persons ordinarily skilled in the art.

The promoter is introduced either separately, or in solution with the Ziegler-Natta catalyst at a flow rate sufficient to sustain a continuous reaction. The example below serves to illustrate this.

The flow rate of all the above components is adjusted to allow for a residence time from 30 minutes to 60 minutes in the reactor at a temperature from 35 degrees Celsius to 65 degrees Celsius, and at a pressure of 190 pounds per square inch gauge (psig) to 230 pounds per square inch gauge (psig).

A final product is formed, which can be a resultant terpolymer or a resultant tetrapolymer. The final product has a broad range of desirable characteristics that can be customized to the desired application.

This process allows for broad molecular weight distribution (MWD) products, which translates to higher green strengths, improved mill handling, and extremely smooth extrusion surfaces due to the relationship between viscosity and shear rate. The product further possesses desirable qualities for extrusion, molding, calandering, or creating a thermoplastic vulcanizate.

At the same time, this process allows for high polyene content in the final product, which translates to faster cure rates, and excellent compression set characteristics for sealing applications.

These unique products possess a combination of characteristics desirable for applications such as extrusion, molding, calendering, or creating a thermoplastic vulcanizate.

This process allows for these products to be created without fouling of the reactor due to gelling, or uncontrolled branching, while utilizing only one reactor and high quantities of polyene. Even highly reactive polyenes such as VNB can be utilized without fouling of the reactor.

Table 1 below is a sample of final products created utilizing this process. As can be seen in this set of samples, the MWD ranges from 1.8 to nearly 8, with weight average molecular weight (Mw) ranging from about 100,000 to greater than 2.4 million.

Tangent delta values range from 0.286 to 5.0. As Tangent Delta values decrease long-chain branching increases. These indicate a very wide range of terpolymers and tetrapolymers with varying degrees of long chain branching, while maintaining the desirably high polyene content, which ranges from 0.55 percent to above 24 percent in the samples below.

The products further may have Mooney viscosities ranging from (ML 1+4@ 125 degrees Celsius) 9 to (ML 1+4@ 150 degrees Celsius) 160, and ethylene to alpha olefin ratios ranging from 40:60 to 80:20.

These customizable products allow persons ordinarily skilled in the art to create compounds suitable for processing via extrusion, molding, or calandering. Further persons ordinarily skilled in the art can create thermoplastic vulcanizates to alter the characteristics of polyolefins.

The compounds can comprise many components known to persons ordinarily skilled in the art, including extender oils.

The combination of high polyene content and high molecular weight is known in the art to be difficult to accomplish in a single reactor system without fouling of the reactor.

Specifically, accomplishing high content of VNB is singularly difficult. Polymers 11 and 20 in the tables below are examples of how the present invention succeeds in solving these problems.

TABLE 1

| Polymer | Mooney Viscosity Ml1 + 4 @ 125 C. | Polyene 1 (ENB) % Weight | Polyene 2 (VNB) % Weight | Ethylene/Propylene Ratio | Mw | Mn | MWD | % > E06 | % < E05 | Tan Delta |
|---|---|---|---|---|---|---|---|---|---|---|
| 1 | 82 | 10.20 | 0.30 | 63/37 | 379,200 | 161,300 | 2.35 | 6.50 | 15.3 | 0.768 |
| 2 | 74 | 9.80 | 0.16 | 63/37 | 394,200 | 150,000 | 2.62 | 7.00 | 16.1 | 0.806 |
| 3 | 97 | 10.20 | 0.30 | 64/36 | 465,600 | 159,200 | 2.91 | 9.98 | 14.4 | 0.671 |
| 4 | 99 | 7.00 | 0.18 | 62/38 | 485,795 | 212,472 | 2.4 | 10.46 | 10.22 | 0.757 |
| 5 | 101.9 | 9.80 | 0.17 | 63/37 | 446,783 | 199,879 | 2.24 | 8.66 | 10.41 | 0.765 |
| 6 | 82.2 | 7.30 | 0.33 | 62/38 | 476,500 | 150,800 | 3.16 | 10.47 | 14.54 | 0.692 |
| 7 | 96.4 | 7.10 | 0.34 | 63/37 | 515,200 | 180,200 | 2.86 | 12.07 | 12.33 | 0.682 |
| 8 | 83 | 7.20 | 0.18 | 64/36 | 410,600 | 182,500 | 2.25 | 7.16 | 12.04 | 0.818 |
| 9 | 78.4 | 9.90 | 0.00 | 62/38 | 448,500 | 155,000 | 2.89 | 8.86 | 14.26 | 0.863 |
| 10 | 172 | 13.60 | 0.23 | 78/22 | 1,610,00 | 257,382 | 6.254 | 29.10 | 7.36 | 0.286 |
| 11 | 29 | 0.00 | 0.90 | 75/25 | 328,492 | 42,828 | 7.67 | 7.73 | 53.22 | 0.65 |
| 12 | N/A | 22.00 | 0.50 | 68/32 | 824,839 | 109,526 | 7.53 | 18.69 | 34.27 | 0.495 |
| 13 | 46 | 12.80 | 0.23 | 60/40 | 309,609 | 90,057 | 3.44 | 5.31 | 32.35 | 0.748 |
| 14 | 170 | 24.70 | 0.55 | 76/24 | 1,234,000 | 348,895 | 3.56 | 27.85 | 1.51 | 0.378 |
| 15 | 50 | 13.80 | 0.24 | 61/39 | 336,713 | 59,586 | 5.65 | 6.40 | 32.46 | 0.659 |
| 16 | 42 | 9.80 | 0.55 | 65/35 | 468,862 | 70,531 | 6.65 | 10.76 | 39.01 | 0.577 |
| 17 | 9 | 0.00 | 0.48 | 50/50 | 109,546 | 59,604 | 1.84 | 0.13 | 60.42 | 5 |
| 18 | 154 at 150 C. | 0 | 2.18 | 74/26 | 2,469,000 | 321,491 | 7.68 | 29.90 | 4.14 | 0.305 |
| 19 | 115 | 12.80 | 0.81 | 73/27 | 854,426 | 176,181 | 4.85 | 17.72 | 14.51 | 0.428 |
| 20 | 47 | 0.00 | 0.80 | 69/31 | 252,555 | 118,632 | 2.13 | 1.08 | 17.56 | 1.75 |

Table 2A and 2B describe the reactor conditions utilized to produce the polymers listed in Table 1.

TABLE 2A

| Polymer | Temperature ° C. | Co-catalyst Concentration % weight | Co-catalyst Flow grams of solution/hour | Catalyst Concentration % weight | Catalyst Flow grams of solution/hour | Promoter Concentration % weight | Promoter Flow grams/hour |
|---|---|---|---|---|---|---|---|
| 1 | 48.0 | 2.3400 | 80 | 0.077800 | 70 | 0.46600 | 70 |
| 2 | 50.5 | 2.3400 | 88 | 0.077800 | 78 | 0.50000 | 78 |
| 3 | 46.5 | 2.3400 | 78 | 0.077800 | 70 | 0.46600 | 70 |
| 4 | 41.7 | 2.3400 | 82 | 0.077800 | 72 | 0.48700 | 72 |
| 5 | 46.4 | 2.3400 | 80 | 0.077800 | 72 | 0.48700 | 72 |
| 6 | 44.9 | 2.3400 | 78 | 0.077800 | 72 | 0.48700 | 72 |
| 7 | 44.2 | 2.3400 | 78 | 0.077800 | 72 | 0.49000 | 72 |
| 8 | 47.0 | 2.3400 | 76 | 0.077800 | 70 | 0.48700 | 70 |
| 9 | 45.6 | 2.3400 | 88 | 0.077800 | 80 | 0.49100 | 80 |
| 10 | 50.0 | 4.0800 | 48 | 0.150000 | 48 | 0.00720 | 48 |
| 11 | 53.0 | 3.2700 | 154 | 0.466000 | 134 | 0.00000 | 0 |
| 12 | 50.5 | 4.0860 | 178 | 0.151300 | 178 | 0.72030 | 178 |
| 13 | 50.5 | 4.0860 | 114 | 0.151300 | 112 | 0.72030 | 112 |
| 14 | 50.5 | 4.0860 | 48 | 0.151300 | 48 | 0.72030 | 48 |
| 15 | 50.5 | 4.0860 | 114 | 0.151300 | 114 | 0.72030 | 114 |

TABLE 2A-continued

| Polymer | Temperature ° C. | Co-catalyst Concentration % weight | Co-catalyst Flow grams of solution/ hour | Catalyst Concentration % weight | Catalyst Flow grams of solution/ hour | Promoter Concentration % weight | Promoter Flow grams/ hour |
|---|---|---|---|---|---|---|---|
| 16 | 50.5 | 4.0860 | 178 | 0.151300 | 180 | 0.72030 | 180 |
| 17 | 50.5 | 4.0860 | 180 | 0.151300 | 180 | 0.72030 | 180 |
| 18 | 50.5 | 4.0860 | 48 | 0.151300 | 48 | 0.72030 | 48 |
| 19 | 50.5 | 4.0860 | 48 | 0.151300 | 48 | 0.72030 | 48 |
| 20 | 35.5 | 4.0860 | 20 | 0.151300 | 12 | 0.72030 | 12 |

TABLE 2B

| Polymer | Polyene 1 Concentration % weight | Polyene 1 Flow grams of solution/ hour | Polyene 2 Concentration % weight | Polyene 2 Flow grams of solution/ hour | Hexane Flow grams/ minute | Hydrogen Flow Standard Liters/ hour | Ethylene Flow grams/ minute | Propylene Flow grams/ minute | Reaction Pressure Pounds/ square inch | % solid grams of product/ gram solution |
|---|---|---|---|---|---|---|---|---|---|---|
| 1 | 60 | 118 | 1.19510 | 294 | 106 | 3.93 | 6.4 | 28 | 200 | 4.28 |
| 2 | 60 | 116 | 1.19510 | 180 | 110 | 3.2 | 6.8 | 25.8 | 200 | 4.43 |
| 3 | 60 | 112 | 3.01460 | 116 | 106 | 4.5 | 6.7 | 24.2 | 200 | 5.00 |
| 4 | 60 | 78 | 1.19600 | 144 | 109 | 4.4 | 6.9 | 14.5 | 200 | 5.82 |
| 5 | 60 | 114 | 1.19600 | 156* | 108 | 4.6 | 6.7 | 24.4 | 200 | 4.52 |
| 6 | 60 | 76 | 3.11200 | 98 | 107 | 5.8 | 6.6 | 18.9 | 200 | 5.52 |
| 7 | 60 | 76 | 3.01460 | 104 | 108 | 4.8 | 6.6 | 19.8 | 200 | 5.26 |
| 8 | 60 | 78 | 1.19600 | 144 | 109 | 4.4 | 6.5 | 19.9 | 200 | 5.01 |
| 9 | 60 | 114 | 0 | 0 | 109 | 4 | 6.7 | 24 | 200 | 5.22 |
| 10 | 28.375 | 180 | 10.97 | 120 | 100 | 6.00 | 4.00 | 5.00 | 200 | 3.90 |
| 11 | 0 | 0 | 4.875 | 114 | 95 | 16.50 | 6.00 | 5.10 | 200 | 6.65 |
| 12 | 56.75 | 180 | 2.967 | 181 | 97 | 3.60 | 4.00 | 5.00 | 200 | 5.50 |
| 13 | 56.75 | 130 | 2.967 | 90 | 98 | 3.60 | 4.00 | 15.50 | 200 | 5.30 |
| 14 | 56.75 | 180 | 2.967 | 179 | 99 | 3.60 | 4.00 | 5.00 | 200 | 4.25 |
| 15 | 56.75 | 129 | 2.967 | 90 | 99 | 3.60 | 4.00 | 15.50 | 200 | 5.18 |
| 16 | 56.75 | 78 | 2.967 | 180 | 98 | 3.60 | 4.00 | 5.00 | 200 | 5.48 |
| 17 | 56.75 | 0 | 2.967 | 48 | 98 | 6.00 | 4.00 | 26.00 | 200 | 6.25 |
| 18 | 56.75 | 0 | 2.967 | 120 | 99 | 6.00 | 4.00 | 5.00 | 200 | 4.10 |
| 19 | 56.75 | 180 | 2.967 | 48 | 99 | 6.00 | 4.00 | 5.00 | 200 | 4.44 |
| 20 | 0 | 0 | 1.01 | 42 | 102 | 7.30 | 4.00 | 5.70 | 200 | 4.38 |

EXAMPLE 1

Polymer 10 in Table 1 Above

In this example a polymer (Polymer 10) having high molecular weight (Mw), broad molecular weight distribution (MWD), high degree of branching and high polyene content is produced. The reactor is charged with hexane at a flow rate of 100 grams per minute at temperature of 50 degrees Celsius, and a reactor pressure of 200 psig.

Next, pure propylene monomer is introduced to the hexane stream at a flow rate of 5 grams per minute.

As the next step, a hydrogen in nitrogen mix with 10 percent hydrogen by weight is introduced to the hexane stream at a flow rate of 6 standard liters per hour.

Next, an ethylidene norbornene (ENB) monomer solution (in hexane) is introduced to the hexane stream with at a flow rate of 180 grams of solution per hour.

As the next step, a 5-vinyl-2-norbornene monomer solution (in hexane) is introduced to the hexane stream at a flow rate of 120 grams per hour.

Next, the chlorinated aluminum alkyl co-catalyst solution (ethyl aluminum sesquichloride in hexane) is fed directly to the reactor by separate stream at a rate of 48 grams of solution per hour.

Subsequently, a Ziegler-Natta catalyst solution (vanadium oxytrichloride in hexane) and a promoter solution (in hexane) are introduced to the reactor by separate stream at flow rates of 48 grams per hour each.

The Ziegler-Natta catalyst and promoter are premixed in hexane to yield a solution that is fed directly to the reactor as a single stream.

In the next step, a polymer grade ethylene monomer is incrementally introduced to the hexane stream to reach a maximum flow rate of 4 grams per minute.

When all reagents have been added to the reactor, the polymerization reaction is allowed to proceed with a residence time of approximately 30 minutes at a temperature of 50.5 degrees Celsius, and a reactor pressure of 200 psig, resulting in a tetrapolymer having the properties of polymer 10 in Table 1.

The tetrapolymer as formed has a weight average molecular weight of 1,610,000, a broad molecular weight distribution (MWD) of 6.25, a Mooney viscosity (ML 1+4@ 125 degrees Celsius) of 170 Mooney Units (MU), and a very low Tangent Delta value of 0.286, indicative of a high level of branching.

After purification and isolation, the tetrapolymer has an ethylene:propylene ratio of 78:22, a VNB weight percent of 0.23 weight percent and ENB content of 13.6 weight percent.

EXAMPLE 2

Polymer 11 in Table 1 Above

In this example a terpolymer (Polymer 11) having moderate molecular weight (Mw), broad molecular weight distribution (MWD), moderate degree of branching and low polyene content is produced. The reactor is charged with hexane at a flow rate of 95 grams per minute at temperature of 53 degrees Celsius, and a reactor pressure of 200 psig.

Next, pure propylene monomer is introduced to the hexane stream at a flow rate of 5.1 grams per minute.

As the next step, a hydrogen in nitrogen mix with 10 percent hydrogen by weight is introduced to the hexane stream at a flow rate of 16.5 standard liters per hour.

As the next step, a 5-vinyl-2-norbornene monomer solution (in hexane) is introduced to the hexane stream at a flow rate of 114 grams per hour.

Next, the chlorinated aluminum alkyl co-catalyst solution (ethyl aluminum sesquichloride in hexane) is fed directly to the reactor by separate stream at a rate of 154 grams of solution per hour.

Subsequently, a Ziegler-Natta catalyst solution (vanadium oxytrichloride in hexane) is introduced to the reactor by separate stream at a flow rate of 134 grams per hour. No catalyst promoter is used with this catalyst.

In the next step, a polymer grade ethylene monomer is incrementally introduced to the hexane stream to reach a maximum flow rate of 6 grams per minute.

When all reagents have been added to the reactor, the polymerization reaction is allowed to proceed with a residence time of about 30 minutes at a temperature of 50.5 degrees Celsius, and a reactor pressure of 200 psig, resulting in a terpolymer having the properties of polymer 11 in Table 1.

After purification and isolation, the terpolymer formed has a weight average molecular weight of 328,492, a broad molecular weight distribution (MWD) of 7.65, a Mooney viscosity (ML 1+4@ 125 degrees Celsius) of 29 Mooney Units (MU), and a low Tangent Delta value of 0.65, indicative of a moderate level of branching.

The terpolymer has an ethylene:propylene ratio of 75:25, and a VNB weight percent of 0.23.

EXAMPLE 3

Polymer 17 in Table 1 Above

In this example a terpolymer (Polymer 17) having low molecular weight (Mw), narrow molecular weight distribution (MWD), no significant branching and low polyene content is produced. The reactor is charged with hexane at a flow rate of 98 grams per minute at temperature of 50.5 degrees Celsius, and a reactor pressure of 200 psig.

Next, pure propylene monomer is introduced to the hexane stream at a flow rate of 26 grams per minute.

As the next step, a hydrogen in nitrogen mix with 10 percent hydrogen by weight is introduced to the hexane stream at a flow rate of 6 standard liters per hour.

As the next step, a 5-vinyl-2-norbornene monomer solution (in hexane) is introduced to the hexane stream at a flow rate of 48 grams per hour.

Next, the chlorinated aluminum alkyl co-catalyst solution (ethyl aluminum sesquichloride in hexane) is fed directly to the reactor by separate stream at a rate of 180 grams of solution per hour.

Subsequently, a Ziegler-Natta catalyst solution (vanadium oxytrichloride in hexane) and promoter is introduced to the reactor by single stream at flow rates of 180 grams per hour.

In the next step, a polymer grade ethylene monomer is incrementally introduced to the hexane stream to reach a maximum flow rate of 4 grams per minute.

When all reagents have been added to the reactor, the polymerization reaction is allowed to proceed with a residence time of about 30 minutes at a temperature of 50.5 degrees Celsius, and a reactor pressure of 200 psig, resulting in a terpolymer having the properties show in polymer 17 of Table 1.

The terpolymer formed has a weight average molecular weight of 109,546, a narrow molecular weight distribution (MWD) of 1.84, a Mooney viscosity (ML 1+4@ 125 degrees Celsius) of 9 Mooney Units (MU), and a high Tangent Delta value of 5, indicative of little or no branching.

After purification and isolation, the terpolymer has an ethylene:propylene ratio of approximately 50:50, and a VNB weight percent of 0.48.

While these embodiments have been described with emphasis on the embodiments, it should be understood that within the scope of the appended claims, the embodiments might be practiced other than as specifically described herein.

What is claimed is:

1. A process for continuously making terpolymers and tetrapolymers, comprising ethylene monomers, alpha olefin monomers, and non-conjugated polyene monomers, comprising:
   a. introducing a saturated hydrocarbon stream;
   b. introducing an alpha olefin monomer to the saturated hydrocarbon stream at a rate sufficient to achieve alpha olefin content in a final product of 14 percent to 50 percent of total weight, wherein the alpha olefin monomer comprises from 3 carbon atoms to 20 carbon atoms;
   c. introducing hydrogen gas to the saturated hydrocarbon stream at a rate sufficient to control the molecular weight of the final product;
   d. introducing a first non-conjugated polyene to the saturated hydrocarbon stream at a rate sufficient to achieve desired first non-conjugated polyene content in the final product;
   e. optionally introducing a second non-conjugated polyene to the saturated hydrocarbon stream at a rate sufficient to achieve desired second non-conjugated polyene content in the final product;
   f. introducing an ethylene monomer to the saturated hydrocarbon stream at a rate sufficient to initiate the polymerization reaction and achieve ethylene content in the final product of 35 percent to 80 percent of total weight;
   g. cooling the saturated hydrocarbon stream, the alpha olefin monomer, hydrogen gas, the first non-conjugated polyene, the second non-conjugated polyene if used, and the ethylene to below 35 degrees Celsius to create a cooled mixture;
   h. concurrently introducing a Ziegler-Natta catalyst, a co-catalyst, and optionally a promoter into a continuous flow reactor, wherein:
       (i) the Ziegler-Natta catalyst comprises a transition metal or a transition metal compound;
       (ii) the co-catalyst comprises a metal alkyl comprising a halogen element; and
       (iii) the promoter if used comprises an oxidizing agent capable of oxidizing the transition metal, and the oxidizing agent is capable of generating at least one halogen free-radical per mole of promoter;
   i. reacting the cooled mixture, the Ziegler-Natta catalyst, the co-catalyst, the promoter if used, the first non-conjugated polyene, and the second non-conjugated polyene if used for 30 minutes to 60 minutes, at a temperature from 35 degrees Celsius to 65 degrees Celsius, and a pressure from 190 psig to 230 psig; and
   j. forming a resultant terpolymer or a resultant tetrapolymer as the final product with the following characteristics:

(i) polymer chain branching as characterized by a tangent delta ranging from 0.286 to 5.0;
(ii) a non-linear relationship between viscosity and shear as characterized by the tangent delta from 0.286 to 5.0;
(iii) a weight average molecular weight of 80,000 to 2,500,000;
(iv) a Mooney viscosity ranging from (ML 1+4@ 125 degrees Celsius) 9 to (ML 1+4@ 150 degrees Celsius) 160;
(v) an ethylene to alpha olefin ratio ranging from 40:60 to 80:20;
(vi) a molecular weight distribution ranging from 1.8 to 8;
(vii) a combined weight content of ethylene and alpha olefin of 70 percent to 99.98 percent based upon the total weight of the resultant terpolymer or resultant tetrapolymer;
(viii) a first non-conjugated polyene content of 0.01 percent to 25 percent by weight content based upon the total weight of the resultant terpolymer or resultant tetrapolymer; and
(ix) a second non-conjugated polyene content if used of 0.01 percent to 5 percent by weight content based upon the total weight of the resultant terpolymer or the resultant tetrapolymer.

2. The process of claim 1, wherein the Ziegler-Natta catalyst and the promoter if used are premixed before introduction to the continuous flow reactor.

3. The process of claim 1, wherein the molar ratio of the co-catalyst to the sum of the catalyst and the promoter if used is from 1 to 50.

4. The process of claim 1, wherein the saturated hydrocarbon stream is hexane.

5. The process of claim 1, wherein the alpha olefin monomer is propylene.

6. The process of claim 1, wherein the alpha olefin monomer is butylene.

7. The process of claim 1, wherein the first non-conjugated polyene and the second non-conjugated polyene if used are both norbornene derivatives.

8. The process of claim 1, wherein the Ziegler-Natta catalyst is a vanadium oxytrichloride or a vanadium vanadate.

9. The process of claim 1, wherein the co-catalyst is Diethylaluminum chloride, Ethylaluminum sesquichloride, or Ethylaluminum dichloride.

10. The process of claim 1, wherein the oxidizing agent is an ester comprising a halogen element.

11. The process of claim 1, wherein the oxidizing agent is Butyl-2methyl, 4,4,4-trichlorobut-2-enoate.

12. The process of claim 1, wherein reacting the cooled mixture, the Ziegler-Natta catalyst, the co-catalyst, the promoter if used, the first non-conjugated polyene, and the second non-conjugated polyene if used occurs in a slurry phase.

13. The process of claim 1, wherein reacting the cooled mixture, the Ziegler-Natta catalyst, the co-catalyst, the promoter if used, the first non-conjugated polyene, and the second non-conjugated polyene if used occurs in a gas phase.

14. A terpolymer made by the process of claim 1.

15. A terpolymer made by the process of claim 1, wherein one of the components is Vinyl Norbornene.

16. A tetrapolymer made by the process of claim 1.

17. A tetrapolymer made by the process of claim 1, wherein one of the components is Vinyl Norbornene.

18. A thermoplastic vulcanizate comprising the final product made by the process of claim 1.

19. The final product of claim 1, further comprising an extender oil.

20. The process of claim 1, wherein reacting the cooled mixture, the Ziegler-Natta catalyst, the co-catalyst, the promoter if used, the first non-conjugated polyene, and the second non-conjugated polyene if used occurs in a solution phase.

* * * * *